United States Patent [19]

Manfre

[11] Patent Number: 6,099,884
[45] Date of Patent: Aug. 8, 2000

[54] PROCESS FOR PRECOOKING FISH

[75] Inventor: Ben L. Manfre, Laguna Hills, Calif.

[73] Assignee: Luthi Machinery & Engineering Co., Inc., Gardena, Calif.

[21] Appl. No.: 09/220,833

[22] Filed: Dec. 23, 1998

[51] Int. Cl.[7] .................................................. A23L 1/325
[52] U.S. Cl. ......................... 426/510; 426/511; 426/129; 426/131
[58] Field of Search ..................... 426/129, 131, 426/510, 511, 407

[56] References Cited

U.S. PATENT DOCUMENTS

| | | | |
|---|---|---|---|
| Re. 35,259 | 6/1996 | Williams | 126/369 |
| 3,179,041 | 4/1965 | Luthi et al. | 100/223 |
| 3,594,196 | 7/1971 | Peterson | 99/158 |
| 3,709,142 | 1/1973 | Peterson | 99/357 |
| 3,729,324 | 4/1973 | Fehmerling | 99/111 |
| 4,087,563 | 5/1978 | Sekiguchi | 426/479 |
| 4,251,557 | 2/1981 | Shimose et al. | 426/417 |
| 4,301,182 | 11/1981 | Simon et al. | 426/250 |
| 4,500,555 | 2/1985 | Chu | 426/479 |
| 4,622,234 | 11/1986 | Okada | 426/643 |
| 5,184,973 | 2/1993 | Orlando et al. | 452/125 |
| 5,549,920 | 8/1996 | Choudhury | 426/516 |

*Primary Examiner*—Nina Bhat
*Attorney, Agent, or Firm*—Lyon & Lyon LLP

[57] ABSTRACT

A process for precooking fish for removal of skin and bones prior to canning. The precooking process includes the steps of enclosing fish in a pressure vessel, heating the fish under pressure by saturated steam with a temperature of above 214° F. to 270° F. until the heat within the fish is sufficient to enable the backbone temperature to reach about 135° F. with equilibration, removing the fish from the pressure vessel with a backbone temperature of 85° F. and equilibrating the heated fish outside of the pressure vessel until the temperature of the backbones of the fish reach about 135° F.

15 Claims, 2 Drawing Sheets

| | DIFFERENCES TO STANDARD RECOVERIES BY FISH SIZE FROM SKIPJACK TUNA PRECOOKED AT VARIOUS TEMPERATURES | | | | | |
|---|---|---|---|---|---|---|
| | PRECOOKING TEMPERATURES | | | | | |
| SAMPLE # | 212 | 220 | 230 | 240 | 250 | 270 |
| 1 | -6.2% | -2.2% | -3.6% | -3.5% | -1.9% | -7.6% |
| 2 | -4.5% | 0.0% | -1.9% | -1.9% | 0.4% | -1.9% |
| 3 | -3.9% | 1.1% | -0.5% | -1.5% | 0.6% | -1.5% |
| 4 | -2.0% | 2.2% | 0.3% | -0.3% | 0.6% | -0.8% |
| 5 | -0.7% | | 3.7% | 0.0% | 0.7% | -0.7% |
| 6 | -0.5% | | | 1.7% | 1.8% | 0.8% |
| 7 | -0.5% | | | | 1.8% | 2.1% |
| 8 | 0.2% | | | | 1.9% | 2.4% |
| 9 | 0.3% | | | | 2.0% | |
| 10 | 0.8% | | | | 2.8% | |
| 11 | 1.0% | | | | 2.9% | |
| 12 | 3.8% | | | | 3.7% | |
| 13 | | | | | 3.7% | |
| 14 | | | | | 3.9% | |
| 15 | | | | | 4.3% | |
| AVERAGE | -1.0% | 0.3% | -0.4% | -0.9% | 1.9% | -0.9% |
| STANDEV | 2.7% | 1.9% | 2.7% | 1.8% | 1.7% | 3.2% |
| COUNT | 12 | 4 | 5 | 5 | 15 | 8 |

Fig. 1

PROCESS FOR PRECOOKING FISH

BACKGROUND OF THE INVENTION

The field of the present invention is fish canning processes.

The canning of tuna and tuna-like fish, including albacore, bluefin, bonito, skipjack, bigeye, tonggol, euthynnus and yellowfin, normally includes precooking. This precooking is to allow easy removal of the skin and the skeleton. The precooking step typically employs hot water from 180° F. to 200° F. or saturated steam with temperatures ranging up to 214° F. One such process and the equipment associated therewith is described in U.S. Pat. No. 3,709,142, the disclosure of which is incorporated herein by reference. The precooking process is necessary but can have certain undesirable results. It reduces the weight of the flesh and can adversely impact the quality of the final product.

In most operations, the fish are delivered in a thawed state with a core temperature of about 30° F. The practice is to raise the backbone temperature of the fish during a precooking process to a range of 120° F. to 160° F. depending on the size and species. Following the precooking, the fish may be cooled by air cooling, water streams, water misting or other conventional processes. Once cooled, the skin and skeleton are typically removed by hand. The flesh, devoid of bones and skin, is then placed in cans and fully cooked in a pressure vessel, also known as a steam retort.

In precooking the fish, mobile racks or trays are typically pushed into a large chamber. The doors are closed and generated steam is introduced. The steam is typically saturated when introduced and, therefore, is supplied at approximately the boiling point of water. Some overpressure often occurs because of the location and size of the vents which may typically be liquid drains. As such precookers are not pressure vessels, it is important to avoid more than a very small pressure above atmosphere.

SUMMARY OF THE INVENTION

The present invention is directed to a process for precooking fish in the preparation of that fish for canning. The fish are enclosed in a pressure vessel where they are pressure cooked by steam. The fish are heated until reaching a temperature that will allow equilibration to a backbone temperature of at least about from 120° F. to 160° F. depending on size and species.

In a first separate aspect of the present invention, the fish are removed from the pressure vessel and equilibrating is accomplished outside of the pressure vessel. When heating under conditions which contribute to maximum yield, the heating is with pressurized saturated steam to a backbone temperature of about 85° F.

In a second separate aspect of the present invention, the fish are pressure cooked by saturated steam at a temperature above 214° F.

In a third separate aspect of the present invention, the fish are pressure cooked by saturated steam at a temperature between above 214° F. and about 270° F. A maximum yield has been found at 244° F.

In a fourth separate aspect of the present invention, the fish are precooked in the pressure vessel at about one atmosphere gauge.

In a fifth separate aspect of the present invention, it is contemplated that the foregoing aspects may be employed together in various combinations.

Thus, it is an object of the present invention to provide an improved precooking process for canning fish. Other and further objects and advantages will appear hereinafter.

BRIEF DESCRIPTION OF THE DRAWINGS

FIG. 1 is a chart of the differences to standard recoveries by fish size from skipjack tuna precooked at various temperatures.

DETAILED DESCRIPTION OF THE PREFERRED EMBODIMENTS

Figure 2:
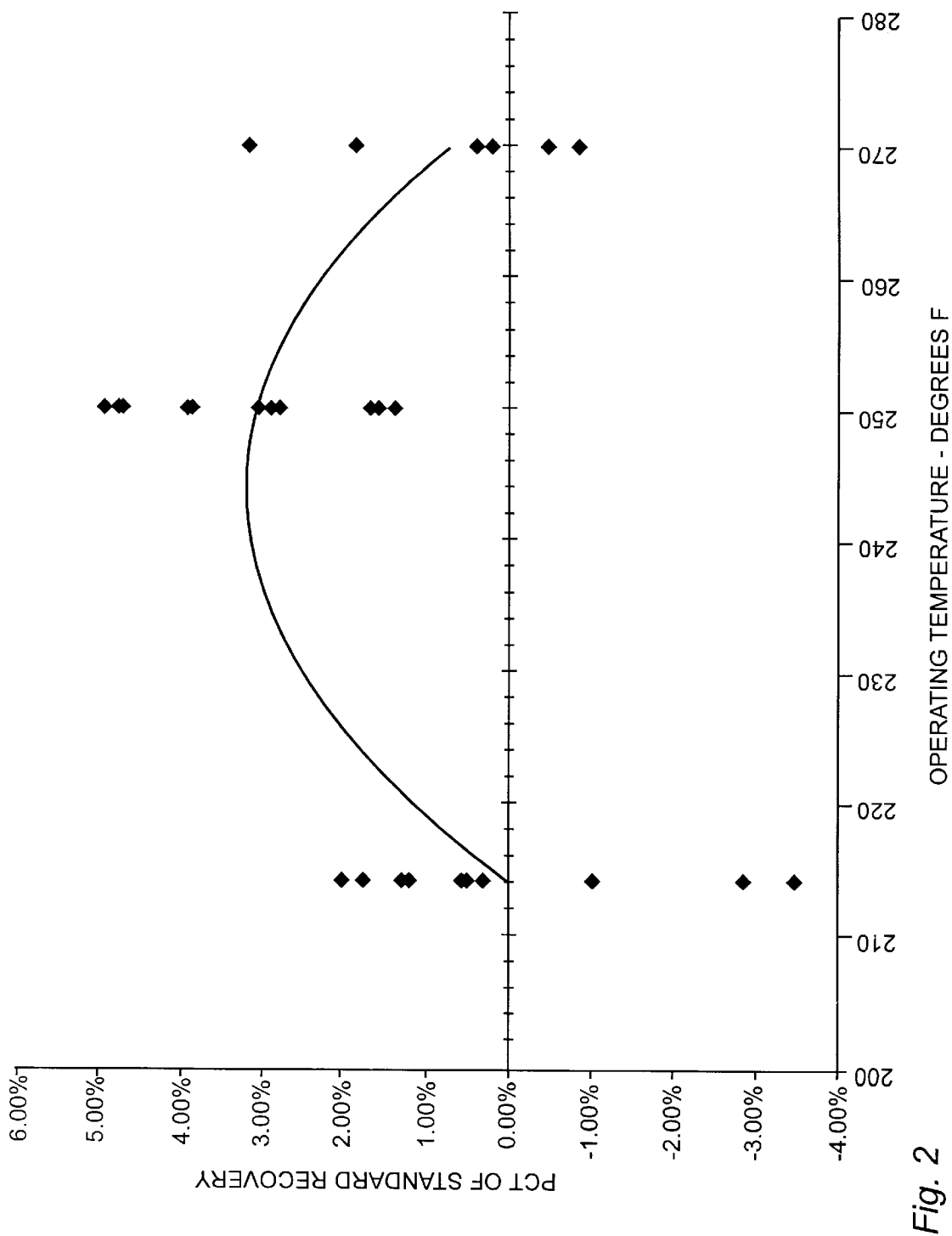
FIG. 2 is a graph of product yield as a percent of standard recovery versus temperature for filtered test data with the high and low extremes excluded.

The precooking process in the preferred embodiment begins conventionally. Before processing, fish are typically held with a backbone temperature at approximately 30° F. The fish are generally eviscerated before precooking as well. After the precooking process, the fish are again conventionally treated. The fish are reduced in temperature to about 100° F. for skinning and deboning. The precooking process itself is novel.

In the precooking process, the fish are enclosed in a pressure vessel and pressure cooked by saturated steam at an elevated temperature. Traditional canning facilities typically include a pressure vessel, or steam retort, where filled cans are subjected to a final cooking process. The preferred embodiment contemplates use of such a standard pressure vessel into which the cold, raw and eviscerated fish are contemplated to be placed as an accommodation to reduce initial costs. More conveniently shaped chambers may be employed in future such systems. Standard racks employed in conventional precooking processes are equally applicable when sized to fit within the pressure vessel. The fish are separated sufficiently to allow relatively free passage of the steam about the fish while in the racks.

Once sufficient heat has been imparted to the fish, equilibration of the temperature within the fish is initiated. The fish may be left in the pressure vessel for the equilibration. However, it is often advantageous to achieve maximum utilization of the pressure vessel. To do this, the racks of heated fish may be removed from the pressure vessel immediately after heating. The fish are then allowed to stand for a period of time while equilibration of the temperature occurs. A convenient and conventional holding area is able to suffice for this equilibration.

Once the fish have reached an equilibrated temperature with the backbone temperature at a conventional 135° F. to 140° F., the precooking is concluded and the fish are conventionally cooled to a temperature of about 100° F. This may be accomplished in conventional cooling facilities with the fish still arranged in the precooking racks. Cold water, misters or air cooling may be and are conventionally used to reduce the temperature of the fish to arrest the cooking process and allow for convenient handling.

Turning to the specific precooking conditions and profiles, FIG. 2 illustrates qualitatively one advantage of the precooking process as a function of temperature. Yield of product was observed from data points with saturated steam temperatures in the range of 212° F. to 270° F. and expressed as a percentage of standard yield as presented in FIG. 1. A curve was constructed through the deletion of high and low values from each group. The curve was constructed through the data points using a quadratic equation and has been recalibrated from the data to define zero percent at the 212° F. average data point. Additional features to this relationship may be discerned through additional data points and curve construction including higher powers. Qualitatively, the yield in final product per unit of raw product increases to a maximum and then decreases. Quantitatively, the peak is found through the foregoing analysis to be about 244° F. with an increase in yield of up to approximately 3% over the yield at 214° F. This peak is based on the information available from the results detailed in FIG. 2 with an estimated line drawn therethrough. This peak is likely to vary based on any number of conditions such as starting temperature, type of fish, size of fish, equipment used, etc. At 270° F., the yield again approaches that of the standard process. In terms of gross revenue, a 3% increase in yield at existing tuna canning plants can amount to millions of dollars per year.

In addition to yield, a sensory analysis of canned skipjack tuna was made on two batches, one precooked under pressure with wet steam significantly above 214° F. and the other precooked without a pressure vessel with wet steam at no more than 214° F. The high temperature precooking yielded a pack that was firm and moist, and had uniform large flakes without curd and a uniform pale pink color in appearance. The odor was characterized as being light meat turkey and briny and the flavor was characterized as light meat turkey and umani. The grade given was high pass. The control batch, in addition to being reduced in yield, was slightly mushy, slightly moist and of a uniform light brown color in appearance. The flavor and odor were characterized as moderate fishy and slightly oxidized. The grade on this control batch was mid pass to borderline pass.

Thus, an improved process for precooking fish in a canning operation is disclosed. While embodiments and applications of this invention have been disclosed, it would be apparent to those skilled in the art that many more modifications are possible without departing from the inventive concepts herein. The invention, therefore is not to be restricted except in the spirit of the appended claims.

What is claimed is:

1. A process for precooking fish in preparation for canning, comprising enclosing fish in a pressure vessel;

heating the fish under pressure by steam until the heat within the fish is sufficient to enable the backbone temperature to reach about 135° F.;

removing the fish from the pressure vessel;

equilibrating the heated fish outside of the pressure vessel until the temperature of the backbones of the fish reach about 135° F.

2. The process for precooking fish in preparation for canning of claim 1, the heating under pressure being by saturated steam.

3. The process for precooking fish in preparation for canning of claim 1, the removing the fish from the pressure vessel being with the backbone temperature at about 85° F.

4. The process for precooking fish in preparation for canning of claim 1, heating the fish under pressure by steam being with the steam saturated and at a temperature above 214° F.

5. The process for precooking fish in preparation for canning of claim 4, heating the fish under pressure by steam being with the saturated steam at no more than about 270° F.

6. The process for precooking fish in preparation for canning of claim 1, heating the fish under pressure by steam being with the steam saturated and at a temperature of about 244° F.

7. The process for precooking fish in preparation for canning of claim 1, heating the fish under pressure being at a pressure of about 1 atm gauge.

8. The process for precooking fish in preparation for canning of claim 1, enclosing fish in a pressure vessel being with the fish at a backbone temperature of 30° F.

9. A process for precooking fish in preparation for canning, comprising enclosing fish in a pressure vessel;

heating the fish under pressure by saturated steam until the heat within the fish is sufficient to enable the backbone temperature to reach about 135° F., the steam having a temperature between 214° F. and about 270° F.;

discontinuing the heating;

equilibrating the fish after discontinuing the heating until the backbone temperature reaches at least about 135° F.

10. The process for precooking fish in preparation for canning of claim 9 further comprising removing the fish from the pressure vessel before equilibrating the fish.

11. The process for precooking fish in preparation for canning of claim 9, heating the fish under pressure by steam being with the steam having a temperature of about 244° F.

12. The process for precooking fish in preparation for canning of claim 9, heating the fish under pressure being at a pressure of about 1 atm gauge.

13. The process for precooking fish in preparation for canning of claim 9 further comprising cooling the fish after equilibrating the fish, until the backbone temperature is about 100° F.

14. The process for precooking fish in preparation for canning of claim 9, enclosing fish in a vessel being with the fish at a backbone temperature of 30° F.

15. A process for precooking fish in preparation for canning, comprising enclosing fish having a backbone temperature of 30° F. in a pressure vessel;

heating the fish at a pressure of about 1 atm gauge by saturated steam;

discontinuing the heating when the heat within the fish is sufficient to enable the backbone temperature to reach about 135° F.;

removing the fish from the vessel;

equilibrating the fish removed from the vessel until the backbone temperature reaches at least about 135° F.

* * * * *